United States Patent
Fano

(10) Patent No.: US 7,949,689 B2
(45) Date of Patent: May 24, 2011

(54) MEDIA INDEXING BEACON AND CAPTURE DEVICE

(75) Inventor: Andrew E. Fano, Chicago, IL (US)

(73) Assignee: Accenture Global Services Limited, Dublin (IE)

(*) Notice: Subject to any disclaimer, the term of this patent is extended or adjusted under 35 U.S.C. 154(b) by 2042 days.

(21) Appl. No.: 10/064,477

(22) Filed: Jul. 18, 2002

(65) Prior Publication Data

US 2004/0015467 A1    Jan. 22, 2004

(51) Int. Cl.
- G06F 7/00 (2006.01)
- G06F 3/00 (2006.01)
- H04N 5/76 (2006.01)

(52) U.S. Cl. .................. 707/804; 725/46; 348/231.1

(58) Field of Classification Search .............. 707/3, 2, 707/1, 7, 804; 708/10; 348/231.1; 725/46
See application file for complete search history.

(56) References Cited

U.S. PATENT DOCUMENTS

| | | | |
|---|---|---|---|
| 2,002,000 A * | 5/1935 | Colburn, Jr. ............... | 366/164.6 |
| 5,335,072 A | 8/1994 | Tanaka et al. | |
| 5,614,940 A * | 3/1997 | Cobbley et al. ............ | 725/138 |
| 5,818,510 A * | 10/1998 | Cobbley et al. ............ | 725/139 |
| 5,822,537 A * | 10/1998 | Katseff et al. ............. | 709/231 |
| 5,890,152 A | 3/1999 | Rapaport et al. | |
| 6,023,705 A * | 2/2000 | Bellinger et al. .......... | 707/200 |
| 6,144,375 A * | 11/2000 | Jain et al. .................. | 715/500.1 |
| 6,151,632 A * | 11/2000 | Chaddha et al. ........... | 709/231 |
| 6,408,301 B1 * | 6/2002 | Patton et al. .............. | 707/102 |
| 6,643,641 B1 | 11/2003 | Snyder | |
| 6,741,996 B1 * | 5/2004 | Brechner et al. ........... | 707/102 |
| 6,833,865 B1 * | 12/2004 | Fuller et al. ............... | 348/231.2 |
| 6,877,010 B2 * | 4/2005 | Smith-Semedo et al. ... | 707/102 |
| 6,937,273 B1 * | 8/2005 | Loui ........................... | 348/231.2 |
| 2001/0014891 A1 | 8/2001 | Hoffert et al. | |
| 2001/0031066 A1 * | 10/2001 | Meyer et al. .............. | 382/100 |
| 2002/0006266 A1 * | 1/2002 | Yoon et al. ................ | 386/69 |
| 2002/0038456 A1 * | 3/2002 | Hansen et al. ............ | 725/46 |
| 2002/0083060 A1 * | 6/2002 | Wang et al. ............... | 707/10 |
| 2002/0166123 A1 * | 11/2002 | Schrader et al. .......... | 725/58 |
| 2003/0009469 A1 * | 1/2003 | Platt et al. ................. | 707/100 |

(Continued)

FOREIGN PATENT DOCUMENTS

EP    0959418 A2    11/1999

(Continued)

OTHER PUBLICATIONS

Addlesee, Mike et al.; Implementing a Sentient Computing System; IEEE; Aug. 2001; pp. 50-56.

(Continued)

*Primary Examiner* — Etienne P LeRoux
*Assistant Examiner* — Cindy Nguyen
(74) *Attorney, Agent, or Firm* — Vedder Price PC

(57) ABSTRACT

A system and method for indexing media files includes capturing a subject in a media file with a media capture device. The media capture device also receives index information from a media indexing beacon, wherein the index information is related to the subject in the media file. The system and method associates the index information with the media file. The media file may then be provided to a media storage device containing other media files having index information associated therewith, whereupon the media files are searchable based on the index information and pertinent media files may be retrieved.

26 Claims, 6 Drawing Sheets

U.S. PATENT DOCUMENTS

| | | | |
|---|---|---|---|
| 2003/0011683 A1* | 1/2003 | Yamasaki et al. | 348/207.1 |
| 2003/0011684 A1* | 1/2003 | Narayanaswami et al. | 348/207.99 |
| 2003/0018647 A1* | 1/2003 | Bialkowski | 707/101 |
| 2003/0023975 A1 | 1/2003 | Schrader et al. | |
| 2003/0033318 A1* | 2/2003 | Carlbom et al. | 707/102 |
| 2003/0120793 A1* | 6/2003 | Marjola | 709/231 |
| 2003/0206717 A1* | 11/2003 | Yogeshwar et al. | 386/69 |
| 2003/0220835 A1* | 11/2003 | Barnes, Jr. | 705/14 |
| 2004/0001154 A1* | 1/2004 | Obrador | 348/231.2 |
| 2004/0040041 A1 | 2/2004 | Crawford | |
| 2004/0073536 A1* | 4/2004 | Smith-Semedo et al. | 707/2 |
| 2004/0128308 A1 | 7/2004 | Obrador | |
| 2004/0133597 A1 | 7/2004 | Fano et al. | |
| 2004/0215643 A1 | 10/2004 | Brechner et al. | |
| 2005/0066219 A1 | 3/2005 | Hoffman et al. | |

FOREIGN PATENT DOCUMENTS

| | | |
|---|---|---|
| WO | 98/10358 | 3/1998 |
| WO | 00/04711 | 1/2000 |
| WO | WO 02/15044 A1 | 2/2002 |

OTHER PUBLICATIONS

Abowd, Gregory D. et al.; Cyberguide: A mobile context-aware tour guide; J.C. Baltzer AG, Science Publishers; 1997; pp. 421-433.

Rekimoto, Jun et al.; The World through the Computer: Computer Augmented Interaction with Real World Environments; UIST; Nov. 1995; pp. 29-36.

European Patent Office International Search Report for International Application No. PCT/EP03/07764 dated Feb. 5, 2004.

* cited by examiner

MEDIA INDEXING BEACON AND CAPTURE DEVICE

BACKGROUND OF THE INVENTION

The present invention relates generally to indexing of media files and more specifically to a technique for automatically associating index information with a media file.

With the growth of consumer electronic devices, specifically electronic and digital devices with recording or capture capabilities, there has been a corresponding increase in the number of captured media files. As the number of captured media files increases, it become increasingly difficult to remember the content of each file, much less organize or search such files based on an understanding of the content of each file. Associating index information with each file can facilitate such activities.

However, there currently does not exist a cost-effective and time efficient manner for indexing multiple media files. One current available method is for an individual to create a separate indexing system by manually applying indexing terms to the media files. If the indexing terms are maintained in a searchable format, the user may then execute searches for pertinent media files. This can be an extremely time-consuming task, i.e. for an individual to view, label and index all previously existing media files and also view, label and index all future media files when they are provided to a secondary storage device. Furthermore, because individual users may create their own indexing schemes, complications may arise when users share or exchange various media files.

Another currently available indexing system is for a third party to index a user's media files. Similar to the user-created index system, this process is extremely inefficient and time consuming and is therefore a costly endeavor. Moreover, this process requires a third party to inspect and catalogue all of a user's media files, which may be undesirable and expensive to the user.

The capture devices, such as digital cameras and camcorders, for example, may provide some relevant indexing information, but this information tends to be limited to such data as the date of capture and the device settings used. They may also allow the user to manually enter a small amount of additional information. Manual entry of the information may be cumbersome and confusing to the typical user. Also, this can be a time-consuming task, which provides limited benefit, unless the user provides these details for all media files.

Another approach to indexing media files employs machine vision techniques to recognize certain elements within a photograph or video. Machine visions approaches, however, currently are limited in their recognition ability. Even as machine vision techniques improve, it remains difficult for machine vision approaches to recognize the context of the subjects within the media file. For example, even if a machine vision approach could recognize that a photograph depicts a baseball game, it would not be possible to recognize that it a specific game, such as a critical play-off game.

Therefore, a need exists for a media file indexing system whereupon a media file may be automatically indexed, which index is searchable to retrieve pertinent media files.

SUMMARY OF THE INVENTION

The present invention provides a system and method for indexing media files. In particular, a subject is captured in a media file, such as digital photograph, a motion picture, a sound recording, or any other suitable media file as recognized by one having ordinary skill in the art. The media file is created using a media capture device, such as a digital camera, an audio recording device, a digital camcorder, or any other suitable media capture device as recognized by one having ordinary skill in the art.

The index information is transmitted from a media indexing beacon at a location and received by the media capture device. The index information is information related directly to the subject of the media file. In the preferred embodiment, the indexing information is descriptive of the subject, i.e. is the semantic content being captured in the media file. Once the index information is received and the media file is captured, the index information is then associated with the media file. For example, the index information can be encoded into a header file on the media file, or stored in a separate index file for the media file. Those having ordinary skill in the art will recognize that any other suitable means for associating may be used for this purpose.

In one embodiment of the present invention, the media capture device stores the media file in a temporary memory buffer, in conjunction with a plurality of other media files. When the user wishes to clear the buffer, the plurality of media files having index information encoded therein are provided to a media file storage device, such as a home computer, a disc drive, a storage drive, or any other suitable storage location. The index information associated with the media files allows the user to search the plurality of media files, for example the index information may be meta-data disposed within the digital file, such as International Press Telecommunications Council (IPTC) format, Exchangeable Image File (EXIF) format, or any other suitable format as recognized by one having ordinary skill in the art. As such, the present invention provides for a system and method for automatically indexing a plurality of media files using a media indexing beacon to transmit index information to a media capture device, wherein the media capture device automatically associates the index information with the media file.

In the system and method of the present invention, a beacon consists of a device that broadcasts information describing, among other things, the location where the beacon is placed. The information broadcast may include, but is not be limited to, the name of the location, contents of the beacon, the current activities taking place, the people who are present (e.g. inspector, engineer, etc.), upcoming and past activities, commercial information, such as processes underway and equipment present in an industrial setting, transactions that occurred in a retail setting along with product information and prices of items present and likely to be depicted in media captured at that moment, etc. Media capture devices equipped to receive broadcasts from such beacons can then use information received from these beacons to index any media captured in the proximity of the beacon.

For example, an indexing beacon placed by Cinderella's castle in Walt Disney World might broadcast over a short range that the location is Cinderella's castle, weather conditions, and nearby activities, such as a parade or fireworks. For commercial information, a beacon in a retail store, such as a furniture store, might broadcast the model name of nearby products, such as pieces of furniture and other product information, or pointers to product information such as universal resource locators (URLs). This information would then be included in the index of the captured media. Such indices could be used in applications to continue a process with the commercial information, such as a future purchase. For example, after taking pictures of furniture in a store, when reviewing pictures at home, a user could then get additional information about the pieces depicted and complete a purchase by working from the information in the index, such as commercial availability, shipping information, related product lines, etc.

BRIEF DESCRIPTION OF DRAWINGS

The invention will be more readily understood with reference to the following drawings, wherein.

DETAILED DESCRIPTION

Figure 1:
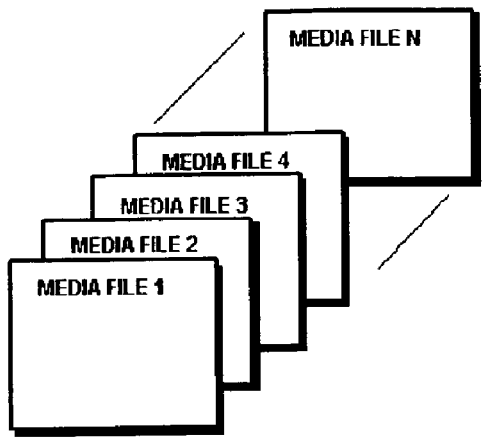
FIG. 1 is a block diagram representation of a prior art media file storage system.

FIG. 1 illustrates a prior art representation of a plurality of media files, media file 1 through media file N. Typically, these media files are created by a media capture device and then stored in a secondary storage device, such as a computer hard drive, a read only memory (ROM), random access memory (RAM), or other suitable memory location, as recognized by one having ordinary skill in the art. As indicated in FIG. 1, the subject or content is implicitly encoded within each media file. Therefore an end user cannot determine the contents of the file, absent a file-naming system or other similar device, without accessing each specific file.

Figure 2:
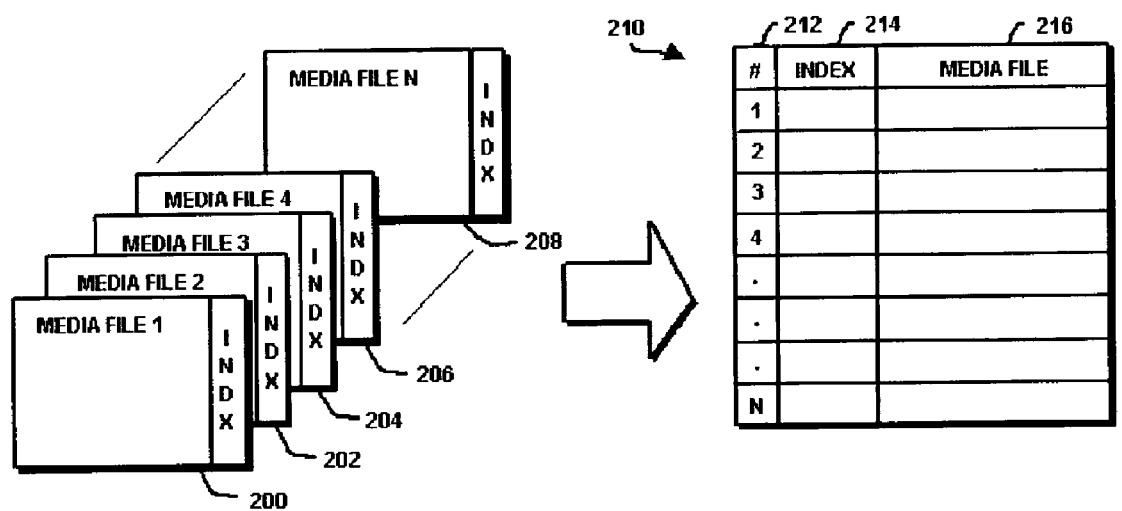
FIG. 2 is a block diagram representation of a media file storage system in accordance with one embodiment of the present invention.

FIG. 2 illustrates a plurality of media files 200-208 containing index information, in accordance with one embodiment of the present invention. The media files 200-208 each include at least one form of index information which is associated with the subject of the media file. For example, the media file may contain a family photograph taken at a prominent landmark, and the index information may contain two forms of index information, a time indicator representing the date and a landmark indicator representing the location.

Typically, the media files are captured by a media capture device and stored in a temporary buffer associated with the media capture device, such as a floppy disc, a flash memory, an internal RAM, a recordable disc, or any other suitable memory storage device as recognized by one having ordinary skill in the art. The media files 200-208 are thereupon provided to a secondary storage device, such as a computer hard drive, a read only memory (ROM), random access memory (RAM), or other suitable memory location, as recognized by one having ordinary skill in the art, where the media files are stored in a searchable and retrievable location.

Table 210 represents a file hierarchy of the stored plurality of media files 200-208, wherein the hierarchy provides for a media file indicator 212, the index information 214 and the media file content 216. The organization or structure of table 210 is for illustrative purposes only; those having ordinary skill in the art will appreciate that other techniques for storing the media files, wherein the media files may be readily searched and pertinent files accessed, may be equally employed. The media files 200-208 may be stored across multiple memory locations and furthermore may be stored across multiple interconnected computing devices, i.e. stored in a centralized or distributed fashion.

Figure 3:
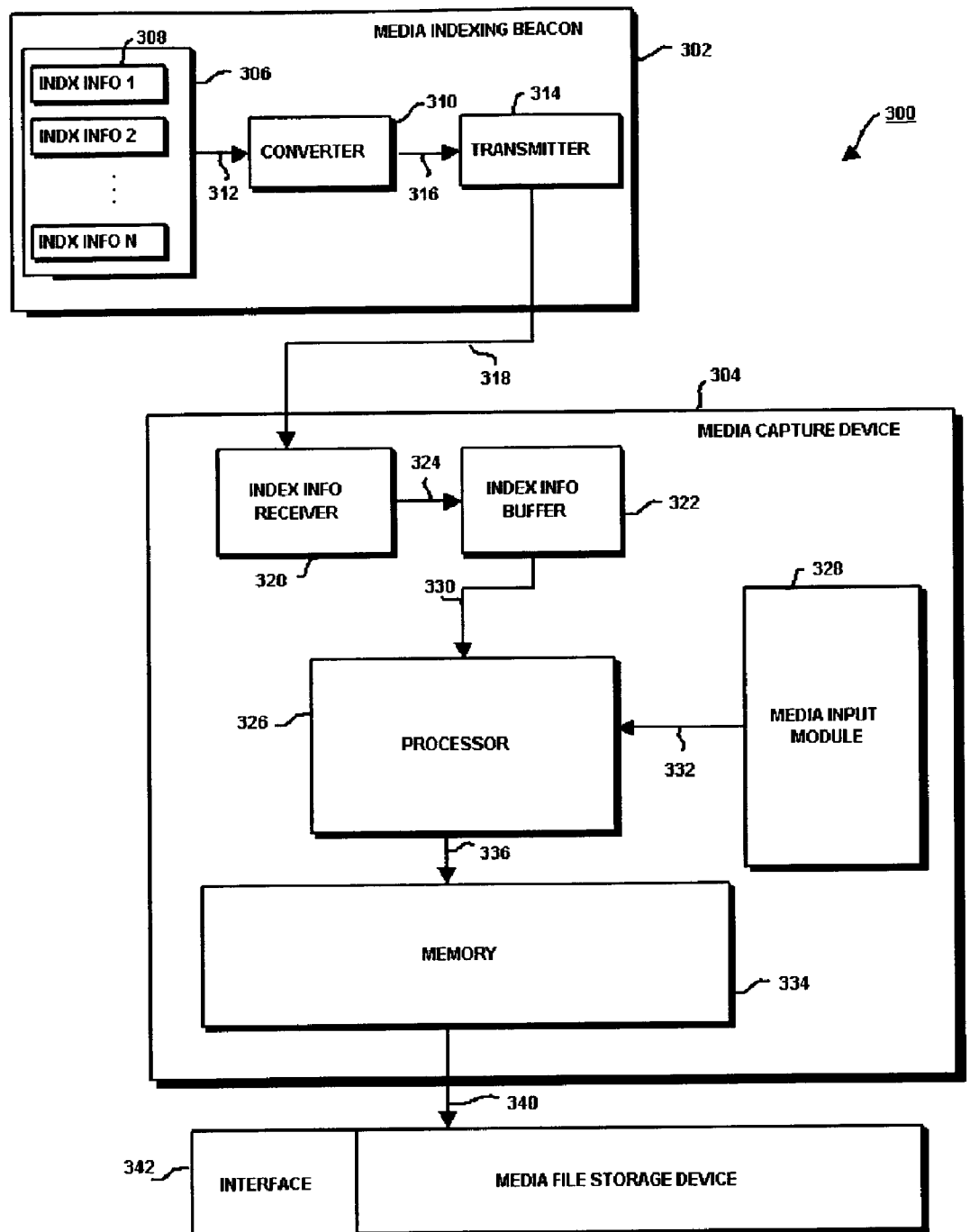
FIG. 3 is a block diagram of a media indexing system in accordance with one embodiment of the present invention.

FIG. 3 illustrates a media indexing system 300, in accordance with one embodiment of the present invention. The system of FIG. 3 represents a push-technology embodiment, wherein index information is pushed from a media indexing beacon 302 to a media capture device 304. The media indexing beacon 302 comprises index information buffer 306, composed of at least one index information 308, such as a time indicator indicating the date and time, a landmark indicator indicating an actual location or landmark where the media indexing beacon is positioned, an event indicator indicating a specific event that is occurring, such as based on the time indicator, a global position indicator which indicates specific global positioning coordinates, a proximity indicator that indicates a nearby location or event, or any other indicator as recognized by one having ordinary skill in the art. In general, the index information comprises any information that, when associated with a media file, would be useful for performing the above-described operations, i.e. searching, categorizing, etc.

Another example of index information is commercial information, which comprises information related to commercial activity, such as information relating to a particular retail item, information relating to product availability, pricing, shipping information, a universal resource locator (URL) to access further information, such as via a company website. Another example is index information compatible with a software package whereupon a user may directly order or conduct further commercial business through the media indexed file using the referenced index information provided by the media indexing beacon 302.

The index information 308 is provided to a converter 310 via connection 312. The converter 310 converts the index information 308 into transmittable format and provides the index information to a transmitter 314 via connection 316. The transmitter 314 transmits the index information 308 to the media capture device 304 via communication path 318 to an index information receiver 320 disposed within the media capture device 304.

The transmission from the media indexing beacon 302 to the media capture device 304 may utilize a wireless networking standard, such as Bluetooth, IEEE 802.11, or other recognized wireless networking standards. The transmission may also utilize other recognized wireless transmissions, such as an infrared beam, a radio wave or other recognized wireless transmission standards. Although, it may be recognized by one having ordinary skill in the art, the communication path 318 is preferably a wireless transmission, wired transmissions, such as using a coaxial cable or a digital line, are within the scope of the present invention.

Within the media capture device 304, the index information receiver 320 receives and decodes the index information and provides the index information to an index information buffer 322, via connection 324. The index information is stored within the buffer 322 until a processor 326 retrieves the index information, in conjunction with capturing a subject in a media file via the media input module 328, such as a digital camera lens and associated hardware, a microphone, or other recognized media input modules used to capture a media file.

The index information is provided to the processor 326 via connection 330 and the captured media file is provided to the processor 326 from the media input module 328, via connection 332. The processor 326 processes the media file and associates the index information therewith. As recognized by one having ordinary skill in the art, the index information may be associated with the media capture device utilizing different approaches, such as actually writing the index information into the media file, generating a pointer file within the media file to reference the index file, generating an index file naming scheme wherein the index file name corresponds to the media file name, or any other association approach wherein the index information is denoted as corresponding to the subject of the media file.

The media file, having index information associated therewith, is then provided to a memory 334 via connection 336. In one embodiment, the index information and the media file are stored within the memory 334 at substantially the same time. The memory 334 within the media capture device 304 is typically a temporary memory where the media files are stored until they are provided to a media file storage device 338, via connection 340. Stored in the memory, 334 or 338, is a data structure where the data structure comprises a media file of the subject captured by the media capture device and a plurality of index information provided from the media indexing beacon relating to the subject.

The media file storage device 338 stores the media files where they may later be accessed. The media file storage device 338 is coupled to an interface 342. The interface 342 may allow for the searching of the media files or enablement of a commercial system. For searching, the interface 342 may receive search criteria corresponding to the index information and for enabling of a commercial system, the interface 342 may provide media files to a processing system based on index information. Thereupon, the media files within the memory 338 may be accessed using the search criteria, allowing for the retrieval of pertinent media files wherein the index information is automatically associated with the media file.

As recognized by one skilled in the art, the media indexing beacon 302 and the media capture device 304 contain other components, which have been omitted for clarity purposes only. Furthermore, in the system of FIG. 3, the indexing beacon 302 acts as a beacon, providing a continuous output of standard index information, whereupon the media capture device receives and utilizes the index information in conjunction with capturing a media file.

Figure 4:
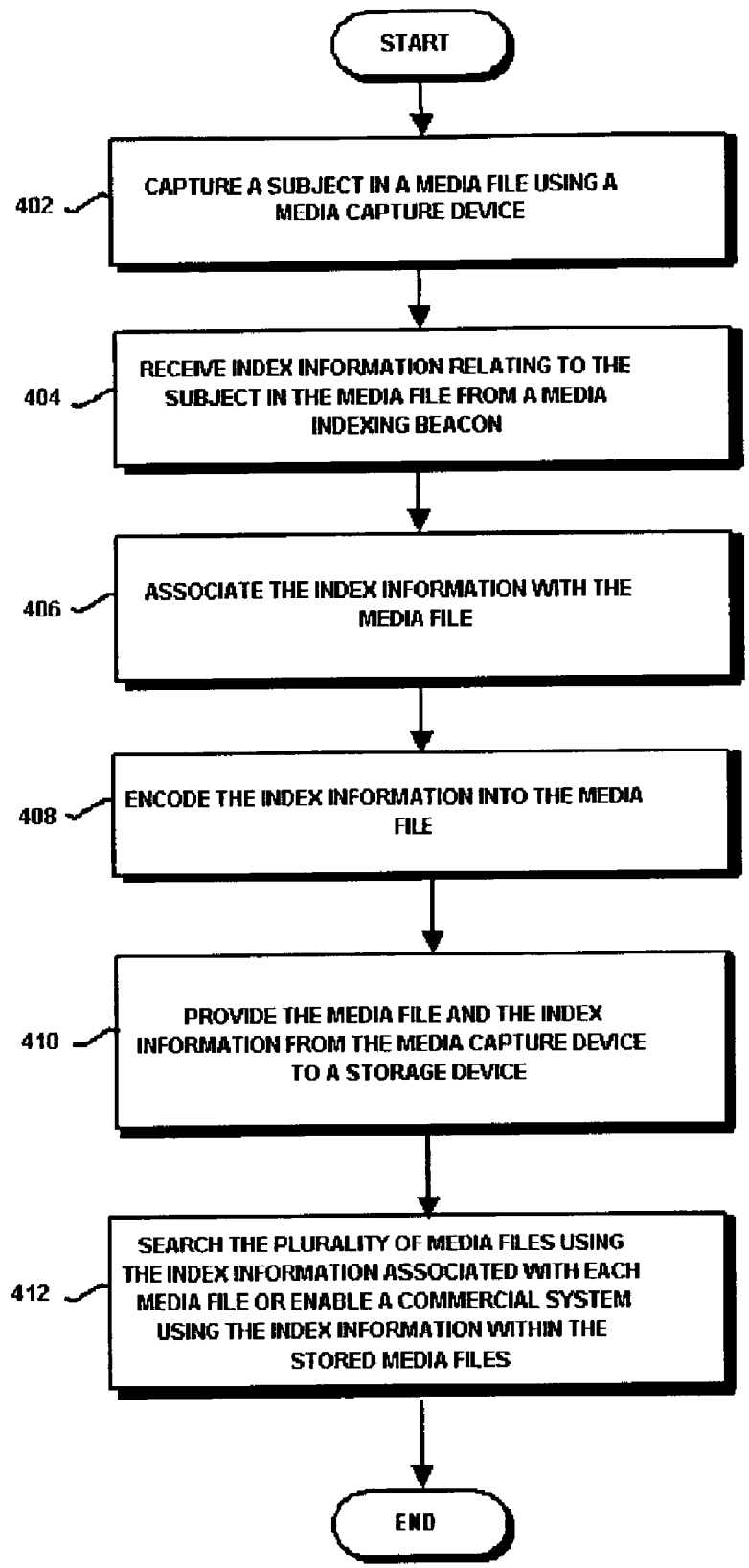
FIG. 4 is a flowchart illustrating the operation of the media indexing system of FIG. 3.

FIG. 4 illustrates a flowchart representing the operation of the media indexing system of FIG. 3. The media capture device 304 captures a subject in a media file, step 402. The subject of the media file may be a landmark, an event, a person or groups of persons at the landmark or event, a sound recording, or any other recognizable subject matter for a media file. The media file is captured using the media input module 328 within the media capture device 304.

Next, step 404, index information relating to the subject in the media file is received from the media indexing beacon 302. As discussed with reference to FIG. 3, the index information is provided from the transmitter 314 to the index information receiver 320, via transmission path 318. The index information is then associated with the media file, designated at step 406, wherein the processor 326 attributes the index information to the subject of the media file for indexing purposes.

Once the media file and index information have been associated, in one embodiment of the present invention, the index information is encoded within the media file, designated at step 408. The index information may be encoded by writing the index information into a header portion of the media file, creating a separate index directly with a direct link to the media file, writing the index information into the media file itself, or any other recognized encoding techniques.

The media file and index information is thereupon provided to a media file storage device 338, designated at step 410. As discussed above, with reference to FIG. 3, the plurality of media files may be searched within the media file storage device using the index information associated therewith or enable a commercial system using the index information within the plurality of media files, step 412. The user may use a search engine to retrieve at least one pertinent media file, based on the index information. For example, using the digital camera as an example of the media capture device and digital photographs as media files, the user may wish to search for all digital photographs relating to a trip to a specific landmark at a specific time. The user may enter the location and date into the search engine, and all digital photographs having matching index information are deemed pertinent and provided to the user.

Figure 5:
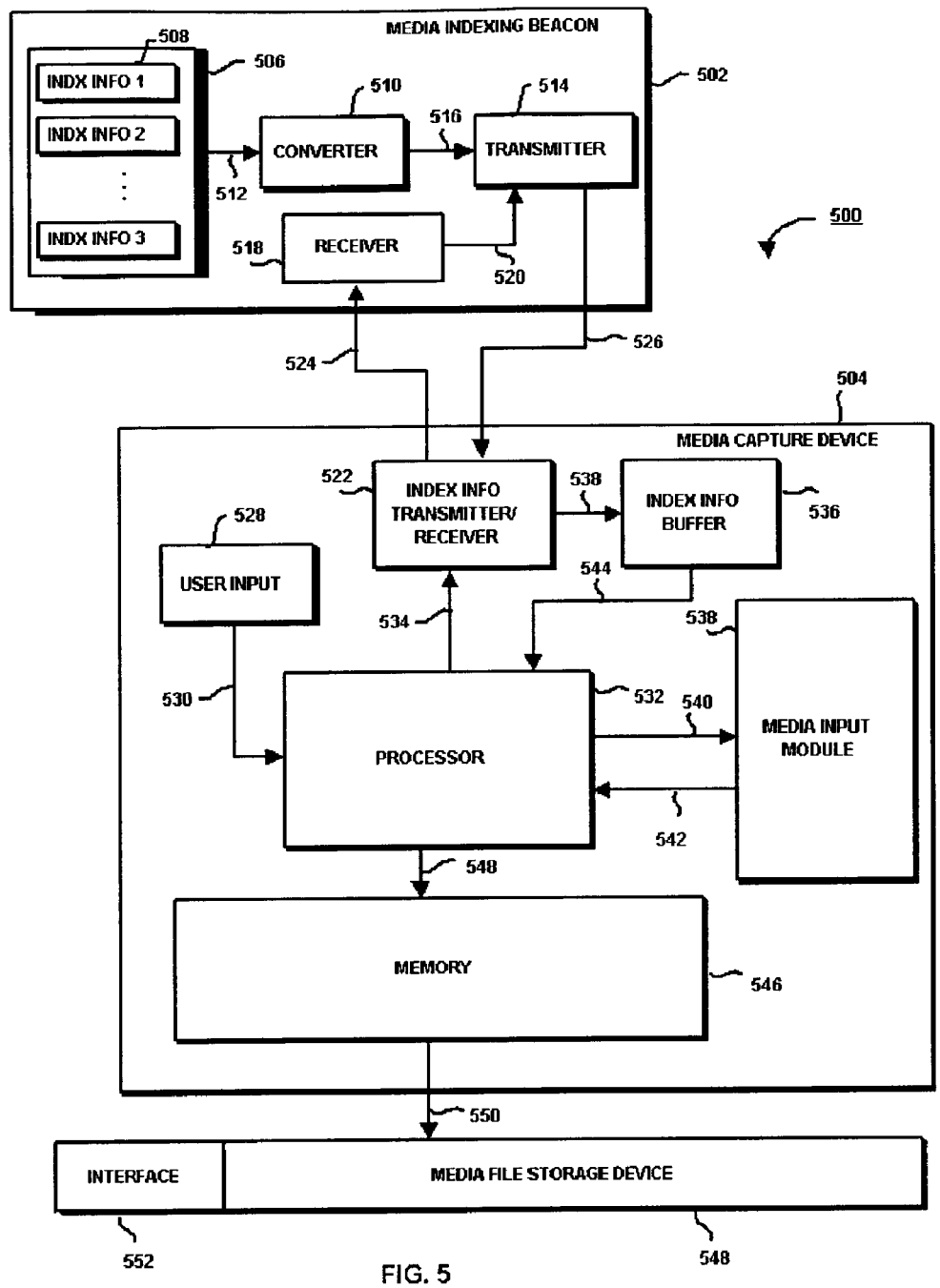
FIG. 5 is a block diagram of a media indexing system in accordance with another embodiment of the present invention.

FIG. 5 illustrates a media indexing system 500, in accordance with another embodiment of the present invention. The system of FIG. 5 represents a pull-technology embodiment, wherein index information is pulled from a media indexing beacon 502 in response to a request from a media capture device 504. Similar to the push-technology embodiment, the media indexing beacon 502 contains index information buffer 506, comprising at least one index information 508, wherein the index information 508 is similar to the index information 308 of the push-technology media indexing beacon described above with reference to FIG. 3.

The index information 508 is provided to a converter 510 via connection 512. The converter 510 converts the index information into transmittable format and provides the index information to a transmitter 514 via connection 516. In the pull-technology embodiment, the media indexing beacon 502 further contains a receiver 518 operably coupled to the transmitter 514 via connection 520.

The media capture device 504 is similar to the media capture device 304 of the push-technology embodiment, wherein the media capture device 504 further contains an index information transmitter/receiver 522. The index information transmitter/receiver 522 provides an index information request to the media indexing beacon 502 via communication path 524. The receiver 518 receives the request and activates the transmitter 514. The transmitter 514 thereupon transmits the converted index information to the index information transmitter/receiver 522 within the media capture device 504, via connection 526. The transmissions between the media indexing beacon 502 and the media capture device 504 may utilize a wireless networking standard, such as Bluetooth, IEEE 802.11, or other recognized wireless networking standards. The transmission may also utilize other recognized wireless transmissions, such as an infrared beam, a radio wave or other recognized wireless transmission standards. Although, it may be recognized by one skilled in the art, the communication paths 524 and 526 are preferably wireless transmissions, but wired transmissions, such as using a coaxial cable or a digital line, are within the scope of the present invention.

The media capture device 504 also contains a user input 528, such as a record button, which is operably coupled via connection 530 to a processor 532. The processor 532 receives the user input and provides an index information request to the index information transmitter/receiver 522 via connection 534. As described above, the index information transmitter/receiver 522 receives the index information, which is thereupon provided to an index information buffer 536 via connection 538.

The processor 532 also sends a media file capture request to a media input module 538 via connection 540. The media module input 538 thereupon captures a subject in a media file and provides the media file to processor via path 542. The processor also receives the index information from the index information buffer 536 via path 544.

The processor associates the index information with the media file and provides the media file having index information associated therewith to a memory 546, via connection 548, within the media capture device 504. The memory 546 may store a plurality of media files having index information associated therewith. The plurality of media files may thereupon be provided to a media file storage device 548 via path 550. The media file storage device 548 stores the media files where they may later be accessed. The media file storage device 548 is coupled to an interface 552. The interface 552 may receive search criteria corresponding to the index information or provide media files to a processing system. Thereupon, media files within the memory 548 may be accessed using the search criteria, allowing for the retrieval of pertinent media files wherein the index information is automatically associated with the media file or a commercial system may be enabled using the index information within the stored media files.

As recognized by one skilled in the art, the media indexing beacon 502 and the media capture device 504 may contain other components, which have been omitted for clarity purposes only. Furthermore, in the system of FIG. 5, the indexing beacon 502 acts in response to a request from the media capture device 504, whereupon the media indexing beacon 502 provides the index information to the media capture device 504 upon request and in conjunction with the capturing of a media file.

Figure 6:
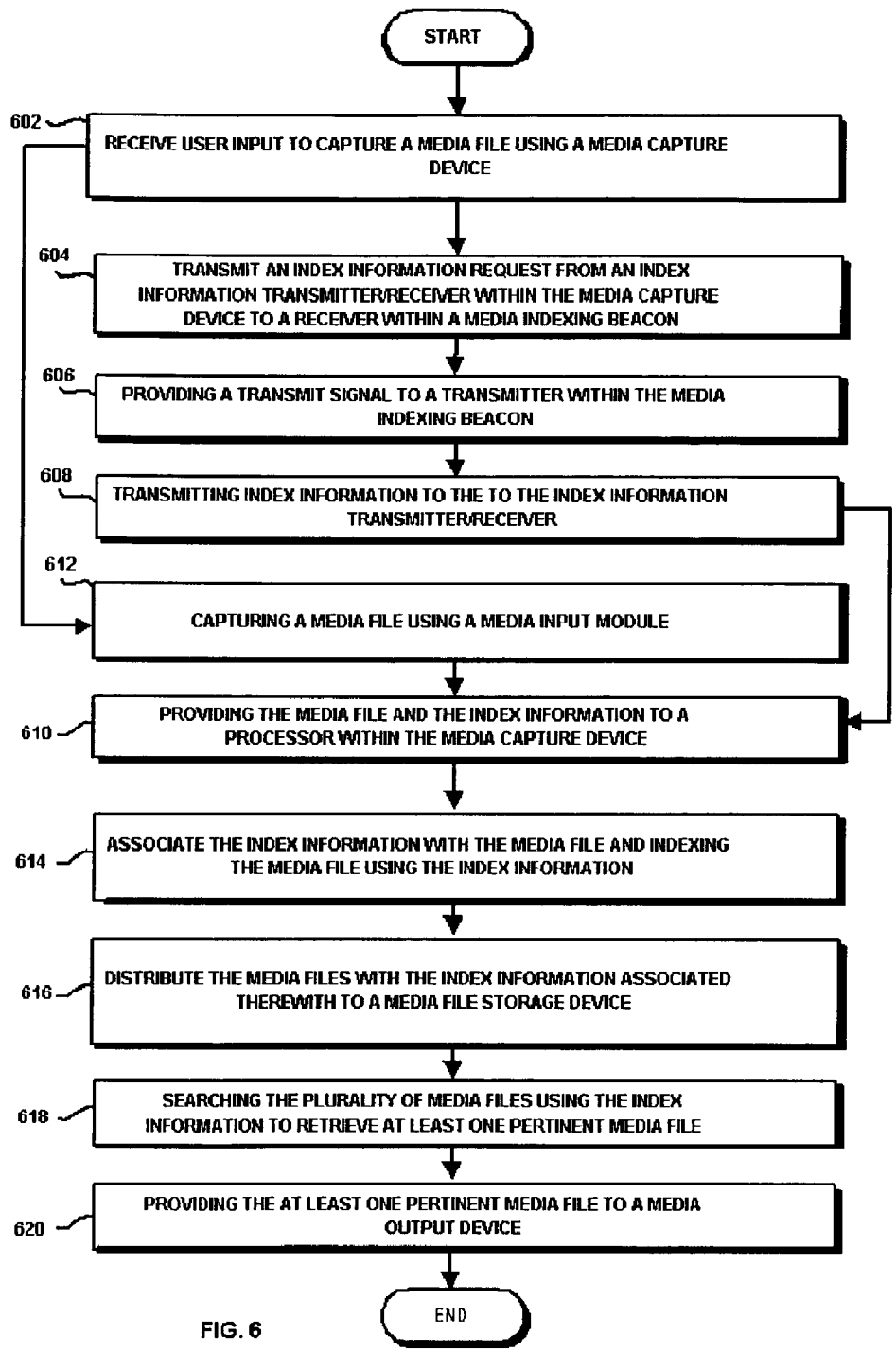
FIG. 6 is a flowchart illustrating the operation of the media indexing system of FIG. 5.

FIG. 6 illustrates a flowchart representing the operation of the media indexing system of FIG. 5. The media capture device receives a user input to capture a subject within a media file, step 602. As illustrated in FIG. 5, the user input is provided to the processor 532 via path 530. The media capture device 504 then transmits an index information request from the index information transmitter/receiver 522 to the receiver 518 within the media indexing beacon 502, designated at step 604.

Next, the receiver 518 sends a transmit signal across path 520 to the transmitter 514, step 606. The transmitter 514 thereupon transmits the index information to the index information transmitter/receiver 522 within the media capture device, designated at step 608. Thereupon, index information is provided to the processor 532 via the index information buffer 536, step 612.

The media capture device also, in response to the user input in step 602, captures a subject in a media file using the media input module 538, step 612. Thereupon, step 610, the media file is also provided to the processor 532 within the media capture device 504.

The processor 532 then associates the index information with the media file, step 614, similar to step 406 of FIG. 4. The media capture device captures a plurality of the media files, wherein the media files are stored in the memory 546. The media files having the index information associated therewith are distributed to the media file storage device 548, designated at step 616.

In utilizing the index information of the media files, the plurality of media files may be searched, using the index information to retrieve pertinent media files, step 618. As described above, the user may enter specific index indicators, such as time, location, event, etc. and the plurality of media files are searchable based on the index information. When pertinent media files (files having matching or corresponding index information) are found, the pertinent media files may then be provided to a media output device step 620, such as a computer monitor, an audio speaker, or any other type of output device as recognized by one having ordinary skill in the art.

Figure 7:
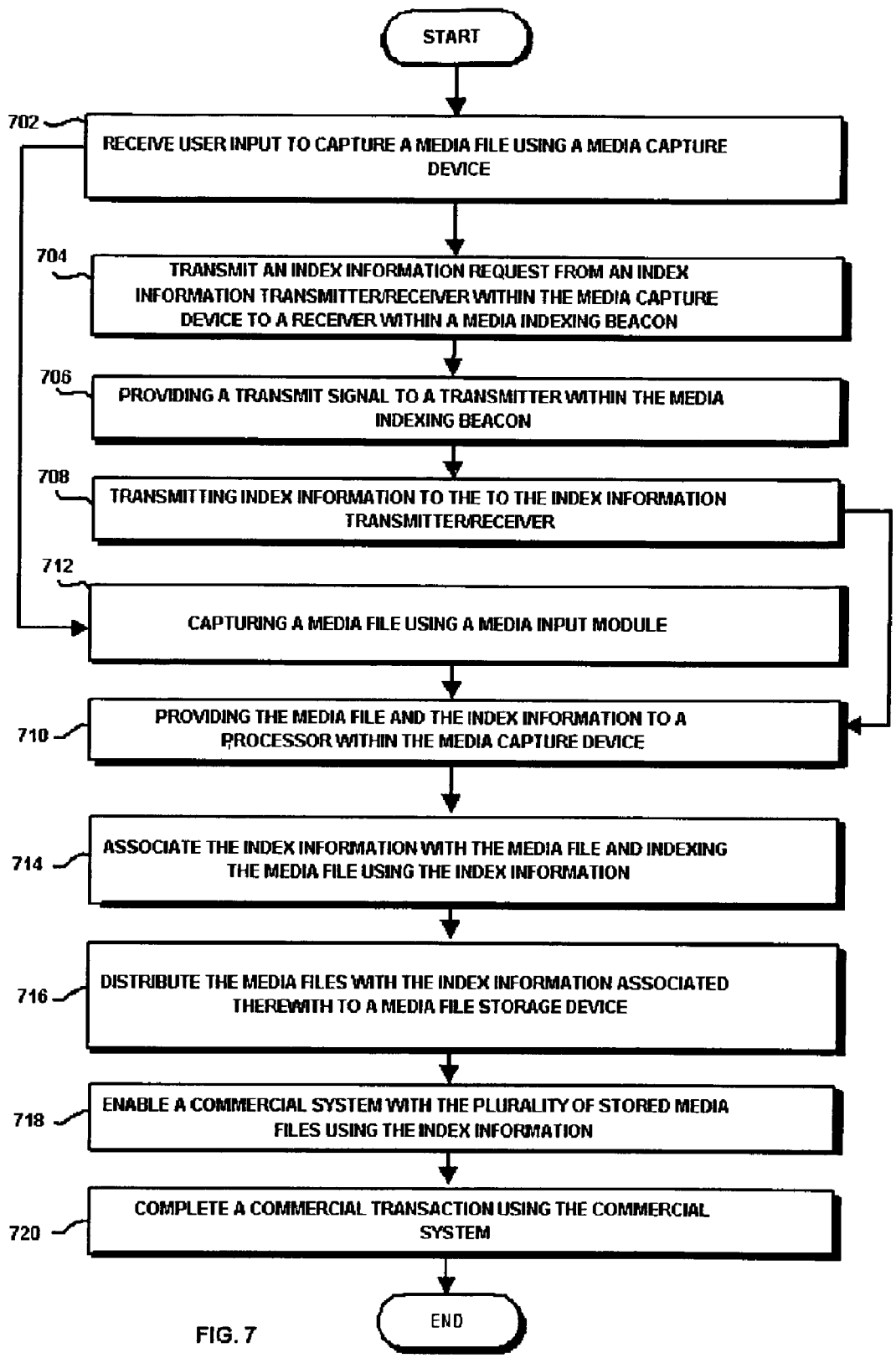
FIG. 7 is flowchart illustration the operation of the media indexing system of FIG. 5 in when the index information is commercial information.

FIG. 7 illustrates another embodiment of the operation of the media indexing system of FIG. 5, wherein the index information is commercial information. Steps 702-716 are substantially identical to steps 602-616, therefore a discussion of these steps is omitted for clarity purposes only. Thereupon, in step 718, a commercial system is enabled with the plurality of stored media files using the index information. Using the example of a retail store, media files of various items may be captured within the store, wherein the media files contain associated index information from a media indexing beacon. Through the interface 552, a commercial system, such as computer program, may utilize the media files to enhance the retail experience. A commercial transaction, designated at step 720, may be completed in response the indexing information from the media files as used by the commercial system.

Referring back to FIGS. 3 and 5, the media indexing beacons 302 and 502 generally disclose a means for storing the index information 306 and 506 and a means for transmitting a beacon signal using a transmitter 314 and 514. As discussed above, the beacon signal comprises index information relating to a subject that may be captured by the media capture device.

Within the media capture device, the media input modules 328 and 538 generally disclose a means for capturing the subject in a media file. The index information receiver 320 and the index information transmitter/receiver 522 generally disclose a means for receiving the index information from the means for generating the beacon signal containing the index information therein. The processor 326 and 532 generally disclose a means for associating the index information with the media file, wherein the function of associating is consistent with the above discussion.

As discussed above, the index information may be any type of information used to derive improved benefit from and accessibility to the various media files. The index information may be personal information used to categorize and make searchable a plurality of media files, or in another example, the index information may be commercial information used to further a commercial transaction. Where the index information is commercial information, the media file having the index information contained therein may be used by a retail sales system, such as an interactive program connected to a retail establishment's dedicated server or company website to initiate, continue, or enhance a commercial sales transaction.

In another example, a plurality of media files may be used in another commercial system, such as a workflow system. In this embodiment, media files of various workflow stations may be acquired with index information associated therewith, where the index information relates to a particular step within a workflow process. The plurality of media files may also be used within a procurement system, similar to a retail system, wherein a buyer may acquire media files of different available items from different suppliers and utilize these media files having index information associated therewith in the procurement system to quickly order items from at least one supplier. In this embodiment, the index information may be information relating to item availability, shipping time and costs, advantages over related items from other suppliers, supplier contact information, URLs to related online locations, such as the suppliers website, recommendations for associated items, etc.

Yet another commercial system which may utilize a plurality of media files having media index information associated therewith is a safety inspecting/auditing system. For example, a facility may be inspected for different certification requirements, such as OSHA requirements or quality control requirements, wherein an inspector may acquire a plurality of media files with index information automatically associated therewith from multiple media indexing beacons. At a later point in time, the media files may be supplied to an auditing system wherein the inspection may be finalized. In one example, specific machines within a factory may contain an indexing beacon that contains index information relating to when the machine was last serviced, average production speed, time and duration of any down periods, equipment operator credentials, or any other information which may be used for an inspection/audit of a facility.

As recognized by one having ordinary skill in the art, media files having index information associated therewith may be utilized in further commercial systems not explicitly listed herein. As such, the above discussion provides examples of different types of commercial systems but the present invention is not limited in this regard.

The present invention provides for a method and system for indexing media files based on a subject within the media file. The subject within the media file may be a location, a date or time, an event, or any other indicative component used to distinguish different media files. The present invention provides for the automatic indexing of the media files based on the association of the media file with the index information. The media file is thereupon stored and the associated index information is searchable such that the user may retrieve pertinent media files. The present invention allows a user to effectively index a plurality of media files without having to engage in further activities, beyond capturing the media file itself.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the basic underlying principles disclosed and claimed herein.

The invention claimed is:

1. A method for media indexing comprising:
   recording a subject that is proximate to a media indexing beacon in a media file with a media recording device, wherein the media indexing beacon is external relative to the media recording device;
   automatically receiving, by the media recording device separate from the media file and from the media indexing beacon, index information descriptive of the subject; and
   associating, by the media recording device, the index information with the media file.

2. The method of claim 1 wherein associating the index information with the media file further comprises:
   encoding the index information into the media file.

3. The method of claim 1 further comprising:
   providing the media file and the index information to a media file storage device which comprises a plurality of stored media files having index information associated therewith; and
   storing the media file along with the plurality of stored media files.

4. The method of claim 3 wherein the media file storage device stores the media file and index information, the method further comprising at least one of the following:
   searching the plurality of stored media files using the index information and enabling a commercial system with the plurality of stored media files using the index information.

5. The method of claim 1 wherein receiving the index information is in response to an index information request.

6. The method of claim 1 wherein the index information comprises at least one of the following: a time indicator, a landmark indicator, an event indicator, a global positioning system indicator, commercial information, a universal resource locator, and a proximity indicator.

7. A method for media indexing comprising:
   storing, in a media indexing beacon external to a media recording device, index information descriptive of a subject that is proximate to the media indexing beacon;
   receiving, by the media indexing beacon, an index information request that is generated by the media recording device; and
   transmitting the index information descriptive of the subject separately to the media recording device in response to receiving the index information request.

8. The method of claim 7 wherein the media recording device receives the index information and associates the index information with a media file.

9. The method of claim 7 wherein the index information is wirelessly transmitted to the media recording device.

10. The method of claim 7 wherein the index information comprises at least one of the following: a time indicator, a landmark indicator, an event indicator, a global positioning system indicator, commercial information, a universal resource locator and a proximity indicator.

11. A method for media indexing comprising:
   recording a subject that is proximate to a media indexing beacon in a media file with a media recording device, wherein the media indexing beacon is external relative to the media recording device;
   providing index information separate from the media file from the media indexing beacon to the media recording device, wherein the index information is descriptive of the subject in the media file; and
   associating, by the media recording device, the index information with the media file.

12. The method of claim 11, prior to providing index information from the media indexing beacon to the media recording device, further comprising
   detecting, by the media recording device, a user input to capture the media file; and
   providing, by the media recording device, an index information request to the media indexing beacon.

13. The method of claim 11 further comprising:
   providing, by the media recording device, the media file having the index information associated therewith to a media file storage device.

14. The method of claim 13 wherein the media file storage device comprises a plurality of stored media files having index information associated therewith, the method further comprising:
   searching the plurality of stored media files using the index information.

15. The method of claim 11 wherein the index information comprises at least one of the following: a time indicator, a landmark indicator, an event indicator, a global positioning system indicator, commercial information, a universal resource locator and a proximity indicator.

16. The method of claim 15 wherein the index information enables a media file to be utilized by at least one commercial system, wherein the at least one commercial system comprises at least one of the following:
   a workflow system, a procurement system, a retail sales system, and a safety inspection/auditing system.

17. A media recording and indexing system comprising:
   a media indexing beacon which generates a beacon signal comprising index information descriptive of a subject proximate to the media indexing beacon; and
   a media recording device, separate from the media indexing beacon, that captures the subject in a media file and separately receives the beacon signal from the media indexing beacon and associates the index information with the media file.

18. The media recording and indexing system of claim 17 wherein the media recording device records a plurality of media files each having index information associated therewith, the system further comprising:
   a media file storage device that receives the plurality of media files, wherein the plurality of media files may be indexed based on the index information.

19. The media recording and indexing system of claim 17 wherein the media indexing beacon further comprises:
   at least one index buffer comprising the index information; and
   a transmitter operably coupled to the at least one index buffer, wherein the transmitter provides the index information to the media recording device.

20. The media recording and indexing system of claim 19 wherein the media indexing beacon further comprises a receiver that receives an index information request from the media recording device, wherein the transmitter transmits the index information in response to the index information request.

21. The media recording and indexing system of claim 17 wherein the media recording device further comprises:
   a media input module which generates the media file in response to a media file generation request;
   a processor operably coupled to the media input module to receive the media file; and
   an index information receiver operably coupled to the processor, wherein the index information receiver receives the beacon signal and provides the index information to the processor, wherein the processor associates the index information with the media file.

22. The media recording and indexing system of claim 21 wherein the index information receiver further contains a transmitter that transmits an index information request to the media indexing beacon.

23. A system for media indexing comprising:
   means for storing index information descriptive of a subject;
   means for transmitting a beacon signal wherein the beacon signal comprises the index information, and wherein the subject is proximate to the means for storing and the means for transmitting; and
   a media recording device, separate from the means for transmitting the beacon signal, that captures the subject in a media file, wherein the media capture device separately receives the index information from the beacon signal and associates the index information with the media file.

24. An apparatus for media indexing comprising:
   means for recording a subject in a media file, wherein the subject is proximate to a media indexing beacon external to the apparatus;
   means for receiving, from the media indexing beacon, index information separate from the media file descriptive of the subject; and
   means for associating the index information with the media file.

25. A non-transitory, computer readable medium having stored thereon:
   a media file of a subject; and index information, associated with the media file, wherein the media file and index information are stored on the medium at substantially the same time; and
   wherein the media file is recorded by a media recording device and the index information, descriptive of the subject, is transmitted separately to the media recording device by a media indexing beacon external to the media recording device, wherein the subject is proximate to the media indexing beacon.

26. The apparatus of claim 24 wherein the apparatus comprises a digital camera and wherein the means for receiving index information includes a wireless receiver.

* * * * *